United States Patent [19]
Necula et al.

[11] Patent Number: 6,128,774
[45] Date of Patent: *Oct. 3, 2000

[54] SAFE TO EXECUTE VERIFICATION OF SOFTWARE

[76] Inventors: George C. Necula, 5562 Hobart St., Apt. B3, Pittsburgh, Pa. 15217; Peter Lee, 7541 Graymore Rd., Pittsburgh, Pa. 15221

[*] Notice: This patent issued on a continued prosecution application filed under 37 CFR 1.53(d), and is subject to the twenty year patent term provisions of 35 U.S.C. 154(a)(2).

[21] Appl. No.: 08/959,730

[22] Filed: Oct. 28, 1997

[51] Int. Cl.[7] .................................................. G06F 9/44

[52] U.S. Cl. .................................................. 717/5; 717/7

[58] Field of Search .................................. 395/705, 708, 395/704

[56] References Cited

U.S. PATENT DOCUMENTS

| | | | |
|---|---|---|---|
| 5,193,180 | 3/1993 | Hastings | 395/710 |
| 5,590,329 | 12/1996 | Goodnow, II | 395/708 |
| 5,596,682 | 1/1997 | Yamazaki | 705/56 |
| 5,692,047 | 11/1997 | McManis | 380/4 |
| 5,761,477 | 6/1998 | Wahbe | 395/406 |
| 5,790,778 | 8/1998 | Bush | 395/704 |
| 5,797,128 | 5/1997 | Birnbaum | 707/5 |
| 5,854,924 | 12/1998 | Rickel | 395/704 |
| 5,920,716 | 11/1996 | Johnson et al. | 395/701 |
| 5,978,484 | 4/1996 | Apperson et al. | 705/54 |
| 5,987,252 | 9/1997 | Leino et al. | 395/704 |

OTHER PUBLICATIONS

Necula, G. et al., "Efficient Representation and Validation of Logical Proofs", Technical Report CMU–CS–97–172, Computer Science Department, Carnegie Mellon University, Oct. 1997.

Detlefs, D., "An Overview of the Extended Static Checking System", Proceedings of the First Formal Methods in Software Practice Workshop 1996.

Harper, R. et al., "A Framework for Defining Logics", Journal of the Association for Computing Machinery 40, 1 (Jan. 1993), pp. 143–84.

Owre, S. et al., "A Prototype Verification System", 11th International Conference on Automated Deduction (CADE), Jun. 1992.

Pfenning, F., "Elf: A Language for Logic Definition and Verified Meta–Programming", Fourth Annual Symposium on Logic in Computer Science, Jun. 1989, IEEE Computer Society Press.

Constable, R., et al., "Implementing Mathematics with the Nuprl Proof Development System", Prentice Hall, 1986, pp. 1–17, 41–95 115–31.

Coquand, T., et al., "Constructions: A Higher Order Proof System for Mechanizing Mathematics", Proceedings of the European Conference on Computer Algebra (EU–ROCAL '85), LNCS 203, Apr. 1985, pp. 151–84.

Gordon, M., "HOL: A Machine Oriented Formulation of Higher Order Logic", Tech. Rep. 68, University of Cambridge, Computer Laboratory, Jul. 1985.

Boyer, R., et al., "A Computational Logic", Academic Press, 1979, pp. 1–55, 87–91, 253–81.

(List continued on next page.)

*Primary Examiner*—Taria R. Hafiz
*Assistant Examiner*—Michael J. Pender, Jr.
*Attorney, Agent, or Firm*—Kirkpatrick & Lockhart LLP

[57] ABSTRACT

A computer-implemented method of verifying that untrusted software supplied by a code producer is safe to execute by a code consumer. The method includes the step of defining a safety policy that specifies safe operating conditions of the untrusted software on the code consumer. The method also includes the steps of generating a safety predicate for the untrusted software that determines if execution by the code consumer of the untrusted software will violate said safety policy and generating a safety proof that proves that said safety predicate is valid. The method further includes the step of validating the untrusted software for execution based on said safety proof and said safety predicate.

29 Claims, 4 Drawing Sheets

OTHER PUBLICATIONS

Luckham, D., et al., "Stanford Pascal Verifier User Manual", Tech. Rep. No. STAN–CS–79–73 1, Department of Computer Science, Stanford Univ., Mar. 1979.

Nelson, G., et al., "Simplification by Cooperating Decision Procedures", Tech. Rep. No. STAN–CS–78–652, Department of Computer Science, Stanford Univ., Apr. 1978.

Adl–Tabatabai, et al., "Efficient and Language–Independent Mobile Programs", School of Computer Science, Carnegie Mellon University, Oct. 1995.

Bershad, et al., "Extensibility, Safety and Performance in the SPIN Operating System", a version appeared in The Proceedings of the $15^{th}$ Symposium on Operating Systems Principles, Department of Computer Science & Engineering, University of Washington.

Engler, et al., "DPF: Fast, Flexible Message Demultiplexing using Dynamic Code Generation", SIGCOMM '96, Aug. 1996.

Engler, et al., "The Operating System Kernel as a Secure Programmable Machine", M.I.T. Laboratory for Computer Science (Publication date unknown).

Hsieh, et al., "Language Support for Extensible Operating Systems", Department of Computer Science and Engineering, University of Washington (Publication date unknown).

IBM Corporation, "Mechanism for Trusted Computing Base Definition and Checking", IBM Technical Disclosure Bulletin, vol. 34, No. 9, pp. 188–191, Feb. 1992.

IBM Corporation, "Mechanism for Trusted Computing Base Isolation", IBM Technical Disclosure Bulletin, vol. 34, No. 8, pp. 214–215, Jan. 1992.

IBM Corporation, "One–Bit Branch Prediction for Processors with Fixed Prediction Mechanism", IBM Technical Disclosure Bulletin, vol. 38, No. 10, p. 217–218, Oct. 1995.

McCanne, et al., "The BSD Packet Filter: A New Architecture for User–level Packet Capture", 1993 Winter USENIX, Jan. 25–29, 1993, pp. 259–269.

Mogul, et al., "The Packet Filter: An Efficient Mechanism for User–level Network Code", Proceedings of the $11^{th}$ Symposium on Operating Systems Principles, ACM SIGOPS, Austin, Texas, Nov. 1987.

Seltzer, et al., "Dealing With Disaster: Surviving Misbehaved Kernel Extensions", Proceedings of the Symposium on Operating System Principles, 1993.

Wahbe, et al., "Efficient Software–Based Fault Isolation", Proceedings of the Symposium on Operating System Principles, 1993.

Wallach, et al., "ASHs: Application–Specific Handlers for High–Performance Messaging", SIGCOMM '96, Aug. 1996.

George C. Necula, Proof–Carrying Code, Proc. of the 24th ACM SIGPLAN–SIGACT Symp'm on Principles of Programming Languages, 106–19, Jan. 1997.

Ravi Sethi, Programming Languages: Concepts and Constructs, 404, 448, 1989.

John C. Mitchell, Foundations for Programming Languages, 402, 693, 1996.

Edsger W. Dijkstra and Carel S. Scholten, Predicate Calculus and Program Semantics, 77, 139, 193, 1990.

Martin Davis, Computability and Unsolvability, 131, 1982.

George C. Necula and Peter Lee, Safe Kernel Extensions without Run–Time Checking [online], Sep. 17, 1996 [retrieved on Jul. 7, 1999]. Retrieved from URL:http://www.cs.cmu.edu/~petel/papers/pcc/osdi.

George C. Necula and Peter Lee, Safe Kernel Extensions without Run–time Checking, Jan. 1996.

SAFE TO EXECUTE VERIFICATION OF SOFTWARE

STATEMENT REGARDING FEDERALLY SPONSORED RESEARCH OR DEVELOPMENT

Certain of the research leading to the present invention was sponsored in part by the Advanced Research Projects Agency CSTO under the title "The Fox Project: Advanced Languages for Systems Software," ARPA Order No. C533, issued by ESC/ENS under Contract No. F19628-95-C-0050. The United States Government may have certain rights in the invention.

BACKGROUND OF THE INVENTION

1. Field of the Invention

The present invention is directed generally to a method and an apparatus for verifying that untrusted software is safe to execute, and, more particularly, to a method and an apparatus that uses safety proofs to determine if untrusted software is safe to execute.

2. Description of the Background

It is often advantageous for computer operating systems to allow application programs to install code fragments in the operating system kernel. This allows for applications to customize the operation of the kernel without incurring the cost of frequent address space changes and the limitations of a fixed application-kernel interface. However, in such an arrangement, the kernel must be able to determine that the untrusted application code respects the system's internal invariants. Malicious code can disrupt the operating system and can cause unexpected and undesirable consequences.

In distributed and web computing, the task of determining whether untrusted code respects the kernel's internal invariants becomes more difficult when mobile code is allowed. In such a situation, a code producer on one part of the network produces a software component that is transmitted to a code consumer on another node for execution.

High level type-safe programming languages, such as ML and Java, are designed with the assumption that they will be used in a closed environment. A programmer using ML or Java must normally assume that all components of the program are written in that language to establish that the program will have the properties conferred by type safety. However, in practice programs often have some components written in ML or Java and other components written in different languages (e.g. C or assembly language). In such a situation, the guarantees provided by the design of the language are lost unless expensive mechanisms such as sockets and processes are employed. In practical implementation terms, however, it is difficult to determine if the invariants of the ML or Java heap will be respected by untrusted code. Thus, an expensive firewall must be used or the risks of the untrusted code compromising the code consumer system must be accepted.

To inexpensively overcome the risk of untrusted code comprising the system, it is necessary that the code consumer be able to ensure that the code supplied by an untrusted code producer has some previously agreed upon set of properties. Cryptography can be used to ensure that the code was produced by a trusted person or compiler. However, cryptography is weak because of its dependency on personal authority. Even trusted persons, or compilers written by them, can make errors.

Thus, there is a need for a mechanism that allows a code consumer to define a safety policy and then verify that the policy is respected by native-code binaries supplied to it by an untrusted code producer. There is also a need for a mechanism that inexpensively ensures that code from an untrusted code producer is safe to execute by a code consumer.

SUMMARY OF THE INVENTION

The present invention is directed to a computer-implemented method of verifying that untrusted software supplied by a code producer is safe to execute by a code consumer. The method includes the step of defining a safety policy that specifies safe operating conditions of the untrusted software on the code consumer. The method also includes the steps of generating a safety predicate for the untrusted software that determines if execution by the code consumer of the untrusted software will violate said safety policy and generating a safety proof that proves that said safety predicate is valid. The method further includes the step of validating the untrusted software for execution based on said safety proof and said safety predicate.

The present invention represents a substantial advance over prior systems and methods for verifying that untrusted software is safe to execute. The present invention has the advantage that the code consumer defines the safety policy, and thus the policy is not limited to a particular notion of "safety."

The present invention has the further advantage that the process used by the code consumer to determine code safety is automatic and can be implemented by a program that is relatively simple and easy to trust. Thus, the safety-critical infrastructure that the code consumer must rely upon is reduced to a minimum.

The present invention also has the advantage that it runs quickly because the code consumer does not modify the code in order to insert costly run-time safety checks. The code consumer also does not perform any other checking once the proof itself has been validated and the code installed.

The present invention also has the advantage that the code consumer does not need to know the identity of the code producer and does not have to know anything about the process by which the code was produced. All of the information needed for determining the safety of the code is included in the code and its proof.

The present invention also has the advantage that it does not require that a particular programming language be used by a computer that incorporates the invention. Instead, the present invention can be used with a wide variety of languages, including machine languages.

These advantages, and other advantages and benefits of the present invention, will become apparent from the Detailed Description of the Preferred Embodiments hereinbelow.

BRIEF DESCRIPTION OF THE DRAWINGS

For the present invention to be clearly understood and readily practiced, the present invention will be described in conjunction with the following figures, wherein.

DETAILED DESCRIPTION OF THE PREFERRED EMBODIMENTS

As used herein, "code consumer" is a server computer, a server process, a server application, an operating system kernel, or the like which executes untrusted software from a code producer. A "code producer" produces software that is untrusted from the perspective of the code consumer and which the code producer would like the code consumer to install and execute. A "proof producer" produces a formal proof for use by the code consumer to determine if the untrusted code is safe to execute. As used herein, the terms "code" and "software" are interchangeable.

Figure 1:
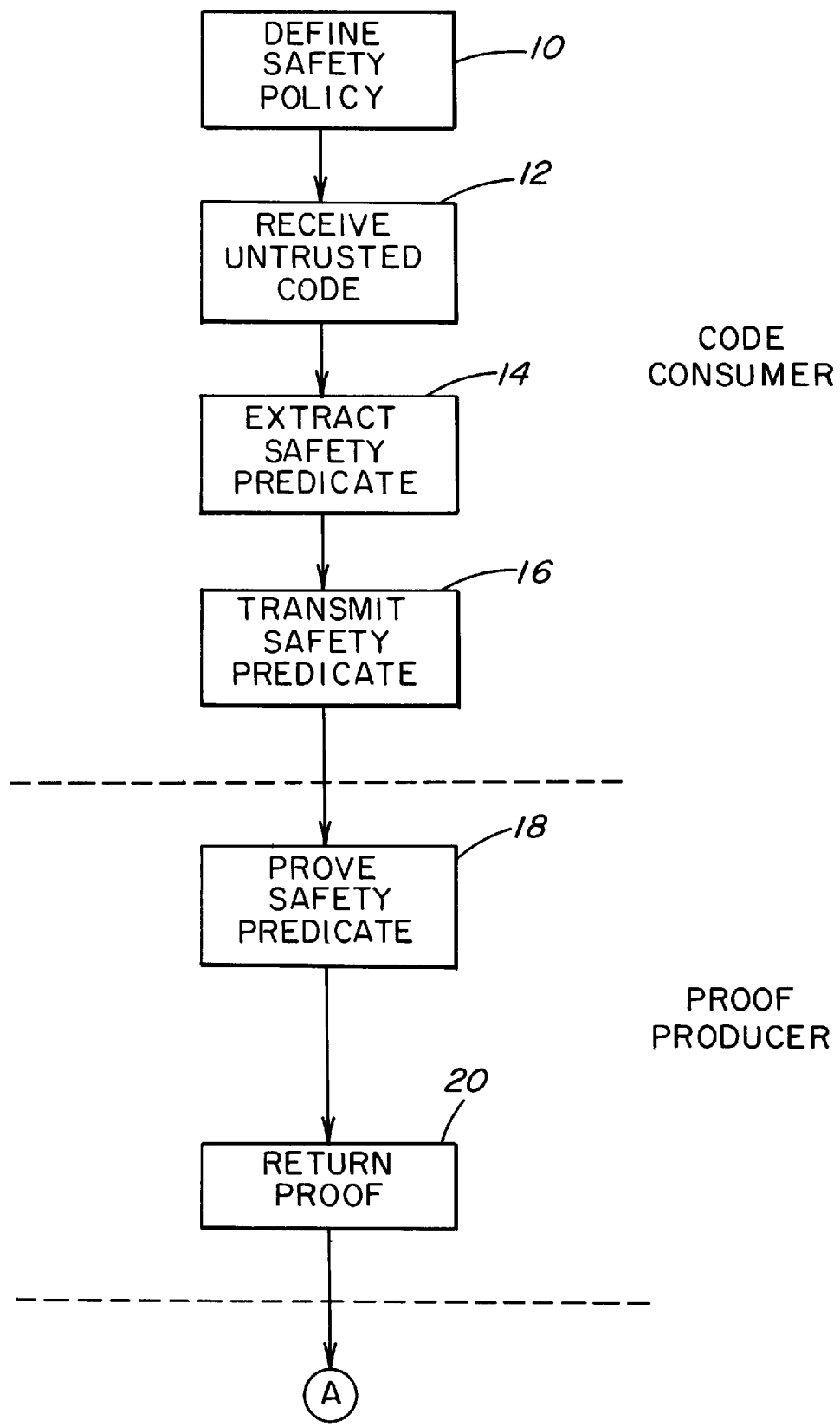
FIG. 1 is a flowchart illustrating the steps performed by the code consumer and proof producer when implementing a pre-stage and a first stage of a preferred embodiment of the present invention.

FIG. 1 is a flowchart illustrating the steps performed by the code consumer and proof producer when implementing a pre-stage and a first stage of a preferred embodiment of the present invention. At step 10, which represents a pre-stage of the code verification process, the code consumer defines a safety policy. The safety policy is a set of rules that specifies precisely under what conditions the execution of the untrusted code is considered to be safe. The safety policy could include, for example, the typical axioms and inference rules shown in Tables 1 and 2 for illustrative purposes. The code consumer implements the safety policy through two components: a VCGen module(described hereinbelow in conjunction with FIGS. 3 and 4), and a set of configuration files that, among other things, define the logic, i.e., the valid axioms and inference rules that may be used in proofs generated by the proof producer.

TABLE 1

$$\frac{}{\triangleright \text{true}}\text{true\_i} \quad \frac{\triangleright P_1 \quad \triangleright P_2}{\triangleright P_1 \wedge P_2}\text{and\_i} \quad \frac{\triangleright P_1 \wedge P_2}{\triangleright P_1}\text{and\_el} \quad \frac{\triangleright P_1 \wedge P_2}{\triangleright P_2}\text{and\_er}$$

$$\frac{}{\triangleright P_1}u \qquad v$$

$$\vdots u \qquad \vdots v$$

$$\frac{\triangleright P_2}{\triangleright P_1 \supset P_2}\text{impl\_i}^u \quad \frac{\triangleright P_1 \supset P_2 \quad \triangleright P_1}{\triangleright P_2}\text{impl\_e} \quad \frac{\triangleright [v/x]P}{\triangleright \forall x.P}\text{all\_i}^v \quad \frac{\triangleright \forall x.P}{\triangleright [e/x]P}\text{all\_e}$$

TABLE 2

$$\frac{}{\triangleright E = E} = \text{id} \quad \frac{\triangleright E_2 = E_1}{\triangleright E_1 = E_2} = \text{sym} \quad \frac{\triangleright E_1 = E_2 \quad \triangleright E_2 = E_3}{\triangleright E_1 = E_3} = \text{tr}$$

$$\frac{}{\triangleright E + 0 = E} + \text{id} \quad \frac{}{\triangleright E_1 + E_2 = E_2 + E_1} + \text{com} \quad \frac{}{\triangleright E - E = 0} + \text{inv}$$

$$\frac{\triangleright E_1 = E_2 \quad \triangleright E_1' = E_2'}{\triangleright E_1 + E_1' = E_2 + E_2'} + \text{congr} \quad \frac{\triangleright E_1 = E_2 \quad \triangleright E_1' = E_2'}{\triangleright E_1 - E_1' = E_2 - E_2'} - \text{congr}$$

$$\frac{}{\triangleright (E_1 + E_2) + E_3 = E_1 + (E_2 + E_3)} + \text{assoc}$$

$$\frac{}{\triangleright (E_1 + E_2) - E_3 = E_1 + (E_2 - E_3)} + -\text{assoc}$$

Tables 1 and 2 contain inference rules and standard notations from the field of computer science. The example illustrated in Table 1 is an excerpt from the standard definition of first-order logic (also known as predicate calculus).

Once the safety policy is defined, stage one of the code verification process begins at step 12. At step 12, the code consumer receives the untrusted code from the code producer. At step 14, the code consumer extracts a safety predicate from the untrusted code. The validity of the safety predicate guarantees that execution of the code will not violate the safety policy. At step 16, the safety predicate is sent to the proof producer. At step 18, the proof producer proves the safety predicate and returns a proof to the code consumer at step 20.

Figure 2:
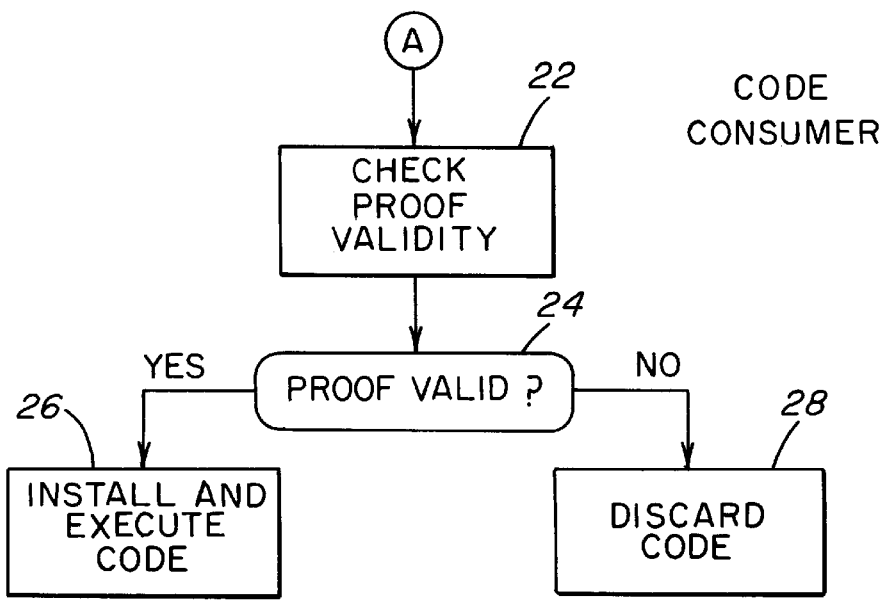
FIG. 2 is a flowchart illustrating the steps performed by the code consumer when implementing a second stage of a preferred embodiment of the present invention.

FIG. 2 is a flowchart illustrating the steps performed by the code consumer when implementing a second stage of a preferred embodiment of the present invention. The second stage of the code verification process begins at step 22. At step 22, the code consumer checks the validity of the proof using a proof checker and decides, at step 24, whether the proof is valid. If the proof is found to be a valid proof of the safety predicate that was extracted in step 14, the untrusted code is installed and executed at step 26. If the proof is found to be an invalid proof of the safety predicate, the untrusted code is discarded at step 28.

Figure 3:
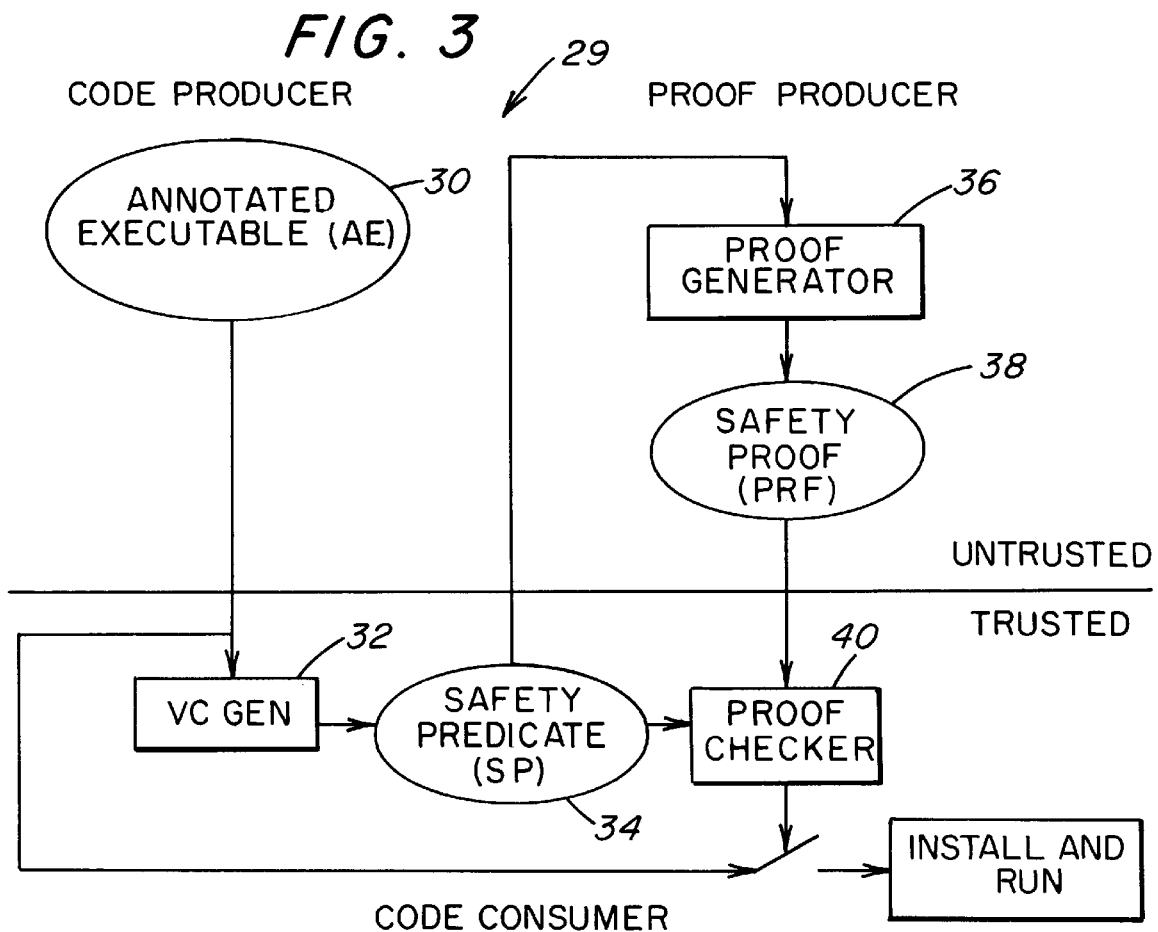
FIG. 3 is a diagram illustrating a preferred embodiment of a code verification system of the present invention.

FIG. 3 is a diagram illustrating a preferred embodiment of a code verification system 29 of the present invention. A code verification session starts with the code producer preparing the untrusted code to be sent to the code consumer. As part of this preparation, the code producer adds annotations to the code to produce annotated executable 30. The annotations, as discussed more fully hereinbelow, contain information that helps the code consumer understand the safety-relevant properties of the code. The code producer then sends the annotated code to the code consumer, requesting its execution.

Upon receiving the annotated executable 30, the code consumer performs a fast but detailed inspection of the annotated executable 30. This is accomplished via a VCGen module 32, which is one component of the consumer-defined safety policy. The VCGen module 32 performs two tasks. First, it checks simple safety properties of the annotated executable 30. For example, it verifies that all immediate jumps are within the code-segment boundaries. Second, the VCGen module 32 watches for instructions whose execution might violate the safety policy. When such an instruction is encountered, the VCGen module 32 emits a predicate that expresses the conditions under which the execution of the instruction is safe. The collection of the verification conditions, together with some control flow information, constitute a safety predicate 34, which is then sent to the proof producer.

Upon receiving the safety predicate 34, the proof producer attempts to prove the safety predicate 34 using a predicate proof generator module 36. If the safety predicate 34 is proven, the proof producer sends an encoding of a formal proof 38 to the code consumer. Because the code consumer does not have to trust the proof producer, any agent can act as a proof producer. In particular the code producer can also act as the proof producer, which might be especially useful in those situations when synthesizing the proof requires extra knowledge about the program or even human interaction.

A proof checker module 40 is used by the code consumer to verify that each inference step in the proof 38 is a valid instance of one of the axioms and inference rules specified as part of the safety policy of the code consumer. In addition, the proof checker module 40 verifies that the proof 38 proves the same safety predicate 34 and not another predicate.

After the annotated executable 30 has passed both the VCGen module 32 checks and the proof checker module 40 check, it is trusted not to violate the safety policy of the code consumer and can be installed for execution. If the particular executable code is run multiple times, the costs associated with the VCGen module 32 and the proof checker module 40 can be amortized over time.

It can be understood by those skilled in the art that the operation of the code verification system 29 of FIG. 3 may be altered to conform to various system requirements. For example, the code producer itself could execute the VCGen module 32 and then submit the resulting predicate 34 to the proof producer. The code and the proof 38 could then be sent together to the code consumer. The code consumer would then execute the VCGen module 32 and verify that the incoming proof 38 proves the resulting safety predicate 34. This arrangement is possible because the VCGen module 32 has an open architecture and it can therefore be given to untrusted code producers to use. To retain the safety guarantees of the present invention, if the code producer executes the VCGen module 32, it is necessary for the code consumer to execute the VCGen module 32 to produce a trustworthy safety predicate 34. Such an arrangement would be useful when the latency of the verification must be minimized because there is a savings due to the elimination of a communication step in generating the safety predicate 34.

As a further example, another variation of the present invention is when the code consumer executes the proof generation module 36. For this to be possible it must be the case that the safety predicate 34 is relatively easy to prove automatically without extra knowledge about the code. This scheme is useful in situations when the proof 38 is too large to be sent over the communication channel between the proof producer and the code consumer. In this embodiment of the present invention, the safety-critical infrastructure, consisting of the VCGen module 32 and the proof checker module 40, remains the same.

As a further example, another variation of the code verification system 29 of FIG. 3 is to use one of the variants above to establish the safety of the code on a given system C, and then forward this code for execution to any other system that trusts C. This trust can be established by any convenient means such as, for example, digital signatures. This scheme is useful in enclaves where there are some trusted machines with the computational power to execute the VCGen module 32 and the proof-checker module 40, and other machines that do not have this power but still want to execute the untrusted code. For example, a firewall might certify external code using the teachings of the present invention and then forward the code without the proof to other machines inside the firewall, with or without a digital signature.

Figure 4:
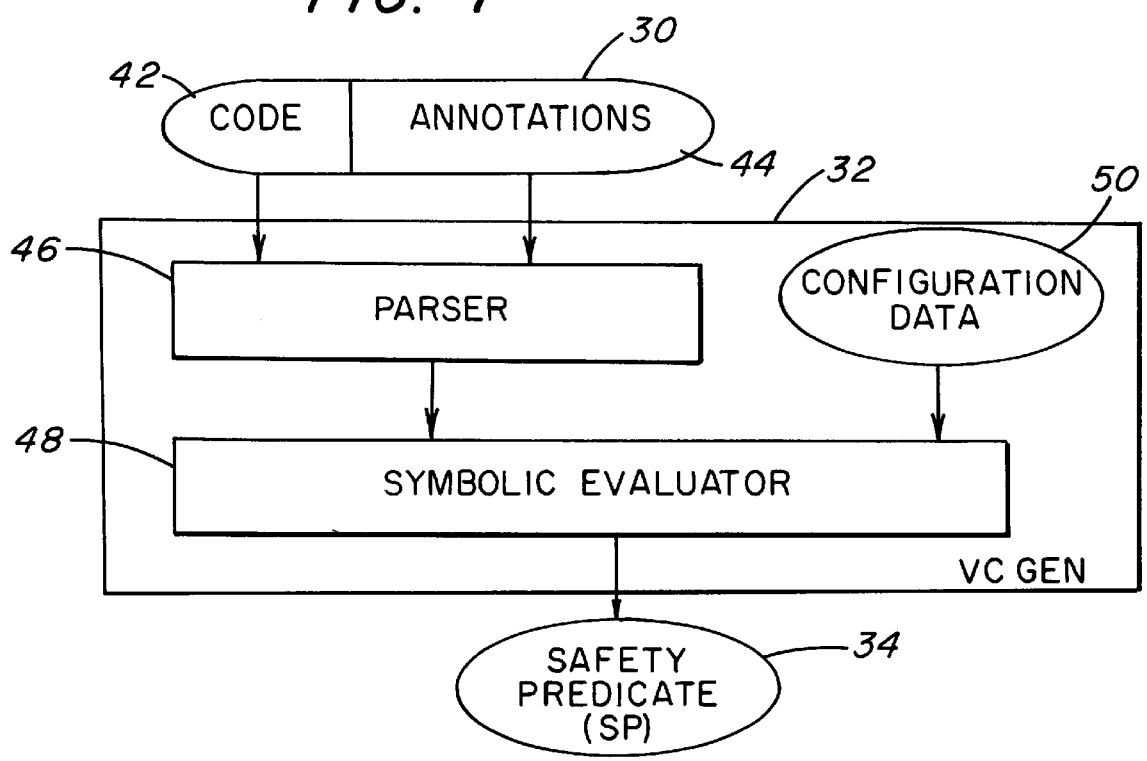
FIG. 4 is a diagram illustrating an implementation of the VCGen module of FIG. 3.

FIG. 4 is a diagram illustrating an implementation of the VCGen module 32 of FIG. 3. To reduce the need for dynamic checking of parameters, the code consumer can declare a precondition, which is essentially a description of the calling convention the consumer will use when invoking the untrusted code. For example, if the untrusted code needs to access Ethernet network packets, the code consumer might declare that the first argument passed to the code is an array of length at least 64 bytes. With this assumption, array accesses to most packet header fields can be proved safe without the need for run-time array-bounds checking. The safety policy can also declare postconditions for the untrusted code. These are constraints on the final execution state of the untrusted code. Both the precondition and postcondition are parameters of the VCGen module 32 and are part of the safety policy.

The annotated executable 30 includes untrusted code 42 and annotations 44. Some of the properties of the code 42 of interest are, in general, difficult to infer from the code 42 directly. In such cases the VCGen module 32 relies on the code annotations 44 provided by the producer as an extra source of information about the behavior of the code 42. But in doing so the VCGen module 32 must be careful not to allow incorrect annotations to hide unsafe program behavior.

For example, the VCGen module 32 verifies that the untrusted code 42 invokes only functions declared by the safety policy. But in many cases it is difficult or impossible to determine from the code 42 alone which function is being invoked at a given call site. This is the case, for example, if the code 42 is presented as machine code for an architecture that has only indirect calls, such as the DEC Alpha. In such a case, the code producer performs the control flow analysis of the code 42 and provides annotations to the annotations 44 which declare the function invoked for each call site. The VCGen module 32 reads the annotations 44 and continues its code inspection assuming that the annotations 44 are correct. To prevent safety breaches, the VCGen module 32 also generates a safety condition for the call site requiring that the value of the expression used in the indirect call is equal to the address of the destination declared through the annotations 44.

An important class of annotations in the annotations 44 is the class of loop invariants. The main purpose of the loop invariants is to associate with each loop a set of properties that are preserved by the execution of the loop body, and that are required for proving the safety of the code 42. The existence of a loop invariant for each loop in the code 42 makes it possible for the VCGen module 32 to extract the safety predicate 34 in just one pass through the code 42. The requirement that every loop has an associated invariant can be easily satisfied by associating an invariant with every backward-branch target.

For each loop invariant two predicates are emitted as part of the safety predicate 34. One predicate verifies that the invariant holds on loop entry and the other verifies that it is preserved through one loop iteration. Then, by induction, the loop invariant can be assumed valid for the purpose of inspecting the loop body and the portion of the code 42 following the loop. Following the standard terminology from the field of automatic program verification, such predicates are referred to as verification conditions.

All annotations in the annotations 44 are implicitly untrusted and, following the model of the loop invariants and call target annotations, are checked using verification conditions.

As shown in FIG. 4, a preferred embodiment of the VCGen module 32 includes two components. One component is a language-dependent parser module 46, whose purpose is to translate the instructions in the untrusted code 42 to a stream of instructions in a generic intermediate language (IL) that is understood by the second component, a symbolic evaluator module 48. The input to the VCGen module 32 is the annotated executable 30, which is provided by the code producer, and a file of configuration data 50, which is provided as part of the safety policy by the code consumer.

The purpose of the VCGen module 32 is twofold—to perform simple checks on the untrusted code 42, and to emit verification conditions for all checks that are mandated by the safety policy but difficult to perform at this time. To simplify the adaptation of the VCGen module 32 to different safety policies, it is useful to restrict the checks performed by the VCGen module 32 to those code properties that are likely to be encountered in many safety policies (e.g., that branch targets are within the code boundaries, or that the function invocations follow a stack discipline). All other checks should then be emitted as general verification conditions, whose interpretation is left to the logic used in the proofs of the safety predicate 34.

For example it is useful to assume that some form of memory safety is always going to be part of the safety policy. However, it is not desirable to hardwire a particular form of memory safety in the VCGen module 32. Instead, the VCGen module 32 emits a generic verification condition saferd (mem, addr) for each attempted read access from address addr in memory state mem. Then, it is left to the proof logic to determine the meaning of the saferd predicate. A given logic might even hold that saferd is never true, thus disallowing any memory read.

The configuration data 50 contains the precondition and the postcondition for the untrusted code 42, both expressed in first-order logic. The code consumer guarantees that the precondition holds when the untrusted code 42 is invoked. The untrusted code 42 must ensure that the postcondition holds on return. The configuration data 50 also describes, by precondition-postcondition pairs, all of the functions that the untrusted code 42 are permitted to invoke. The precondition for such a function is a predicate that the untrusted code 42 must establish before calling the function (e.g., that the integer passed to a memory allocation function is positive); the postcondition is a predicate that the untrusted code 42 may assume to hold upon return from the function.

Flags that can change the default interpretation of the code 42 by the parser or the symbolic evaluator module 48 are also included in the configuration data 50. For example, one such flag might instruct the symbolic evaluator module 48 to consider the stack frame as an extension of the register file, instead of an arbitrary region of memory.

The purpose of the language dependent parser module 46 is to provide a machine and language-independent interface to the symbolic evaluator module 48. While translating instructions from the incoming language to the intermediate language, the parser module 46 abstracts over language and code details that are not relevant to the safety policy.

An example of an intermediate language (IL) syntax is shown in Table 3. One of the design goals for the IL is to make parsing machine code easy. This is achieved by selecting a generic assembly language as the IL. The examples presented in this paper require one distinguished variable mem for denoting the state of the memory during symbolic evaluation. If the safety policy makes explicit use of other state components besides memory, then they are modeled in a similar fashion. Beyond this requirement, the kinds of variables and labels are left abstract because they depend on the particular source language being parsed.

TABLE 3

| Variables | Vars | x |
| Variable sets | P(Vars) | s |
| Labels | Label | l |
| Expressions | Expr | e ::= x \| n \| $e_1 + e_2$ \| $e_1 - e_2$ \| $e_1$ mod n \| sel $(e_1,e_2)$ \| upd $(e_1,e_2,e_3)$ |

TABLE 3-continued

| Predicates | Pred | P ::= true \| false \| $P_1 \wedge P_2$ \| $P_1 \supset P_2$ \| $\forall x.P_x$ \| $e_1 = e_2$ \| $e_1 \neq e_2$ \| $e_1 \geq e_2$ \| $e_1 < e_2$ \| saferd $(e_1,e_2)$ \| safewr $(e_1,e_2,e_3)$ |
| Instructions | Instr | c ::= SET x, e<br>ASSERT P<br>BRANCH $P_1 \to l_1 \square P_2 \to l_2$<br>CALL l<br>RET<br>INV P,s<br>MEMRD e<br>MEMWR $e_1,e_2$ |

For expository purposes, the set of expressions described herein is restricted to the few constructors used in examples. However, it can be understood by those skilled in the art that, in practice, expressions for most arithmetic and logical operations would also need to be included. The expression constructor sel$(e_1,e_2)$ denotes the contents of memory address $e_2$ in the memory state denoted by $e_1$. The expression upd $(e_1,e_2,e_3)$ denotes the new memory state obtained from the old state $e_1$ by updating the location $e_2$ with the value denoted by $e_3$.

As with the expressions, the set of predicates is also restricted to a small subset of first-order logic. In practice, any extension of first-order logic can be used, including higher-order logic, linear or temporal logic. Two special predicates are used when assuming that a form of memory safety will always be part of a safety policy. The predicate saferd$(e_1,e_2)$ is valid if in the memory state denoted by $e_1$ it is safe to read from the address denoted by $e_2$. The predicate safewr is used similarly for memory writes, with the extra argument denoting the value being written. Again, for the purposes of illustration, the set of instructions is reduced to the minimum necessary. However, it can be understood by those skilled in the art that in practice, a more comprehensive set of instructions is used. The SET instruction is an assignment instruction with the right-hand side a symbolic expression. The ASSERT instruction is used by the parser to instruct the symbolic evaluator module 48 to emit a verification condition. The invariant instruction INV P,s requires that predicate P be valid at the corresponding program point and it also declares the maximal set of variables that might be modified on all loop paths that contain this instruction. The set of modified variables is an optimization allowing the symbolic evaluator module 48 to construct smaller safety predicates. If it is missing then it is conservatively approximated with the set of all variables in scope.

The instructions MEMRD and MEMWR are used by the parser module 46 to signal to the symbolic evaluator module 48 that a memory access instruction was decoded. The instructions can be safely ignored if the safety policy is not concerned with memory safety because the state changing semantics are redundantly expressed as SET instructions. See Table 4, which shows the partial definition of the parser for the DEC Alpha machine code as a mapping from sequences of DEC Alpha machine instructions and annotations to sequences of IL instructions, for examples.

TABLE 4

| DEC Alpha | IL | Observations |
|---|---|---|
| start of function | SET $sp_0$,sp<br>SET $ra_0$,ra | At the start of function save the values of the stack pointer and return address. |
| addq $r_1,r_2,r_d$ | SET $r_d,r_1 + r_2$ | Prototype for arithmetic and logical instructions |
| ANN_CALL (f)<br>jsr ra, (pv) | ASSERT sp = $sp_0$ – fsz<br>ASSERT pv = f<br>CALL f<br>SET ra,pc + 4 | Require a CALL annotation. Emit checks for the stack pointer and the correctness of the annotation. The return address register is changed by the call. |
| jsr zero, (ra) | ASSERT sp = $sp_0$<br>ASSERT ra = $ra_0$<br>RET | On return, verify the stack pointer and the return address. |
| ANN_INV (P,s) | INV P,s | Invariant annotations are propagated unchanged |
| ldq $r_d$,n(sp) | ASSERT sp = $sp_0$ – fsz<br>SET $r_d,f_j$ | Check that 0 <= n < fsz and n mod 8 = 0. Let j = n/8. Emit check for the stack pointer. |
| ldq $r_d$,n($r_b$) | MEMRD $r_b$ + n<br>SET $r_d$,sel (mem,$r_b$ + n) | For other load instructions signal the read and its effect of the state. |
| stq $r_s$,n(sp) | ASSERT sp = $sp_0$ – fsz<br>SET $f_j,r_s$ | Check that 0 <= n < fsz and n mod 8 = 0. Let j = n/8. Emit check for the stack pointer. |
| stq $r_s$,n($r_b$) | MEMWR $r_b$ + n,$r_s$<br>SET mem,upd (mem,$r_b$ + n,$r_s$) | For other store instructions signal the write and its effect on the memory state. |
| beq $r_s$,n | BRANCH $r_s$ = 0 → L(pc + n + 4)<br>☐ $r_s$ ≠ 0 → L(pc + 4) | L is a mapping from DEC Alpha machine code addresses to indices within the stream of IL instructions. |

An example of a parser from a subset of DEC Alpha machine code to the IL presented above follows. The set of variables in this case are the 32 machine registers of the DEC Alpha plus the special memory variable mem. To simplify the resulting safety predicate the parser interprets the spill area of the stack frame as an extension of the register file. To avoid the danger of aliasing in the spill area the safety policy must ensure that this area is not declared as "safe-to-access" by arbitrary memory operations. The set of IL variables is extended with $f_0, \ldots, f_{F-1}$, where F is a limit imposed on the number of spill slots, is extended. To keep the parser simple, the untrusted code is required to declare its frame size fsz. Also, only memory accesses through the register sp will be interpreted as accesses to the stack. All other accesses are treated as ordinary memory accesses.

For the purpose of checking procedure calls and returns two other special variables, $sp_0$ and $ra_0$, that are used to keep the initial values of the stack pointer and return address registers, are defined. The DEC Alpha has only indirect procedure calls that are difficult to translate to the IL call syntax, which requires an immediate label. This information gap is bridged by requiring, in the position immediately preceding the call instruction, an annotation ANN_CALL that declares the actual call target.

Table 4 shows the partial definition of the parser for the DEC Alpha machine code as a mapping from sequences of DEC Alpha machine instructions and annotations to sequences of IL instructions. Each line in the table is assumed to occur at index pc in the machine code. For convenience it is assumed that annotations are in-lined in the machine code. In practice, the actual implementation stores the annotations off-line in the data segment.

The symbol "☐" of Table 4 refers to "guarded commands", which encode the if-then-else construct. In Table 4, the symbol "☐" can be read as the "elseif" keyword.

In Table 4, the variable "n" refers to the offset value for the respective instruction for which it is used.

The symbolic evaluator module 48 executes the intermediate code produced by the parser module 46. The main difference between the symbolic evaluator module 48 and a real evaluator is that the symbolic evaluator module 48 does not actually perform the atomic operations, but instead computes the result as a symbolic expression. Also, the symbolic evaluator module 48 considers both branches of a conditional because it cannot determine statically which branch is actually taken at run time. Yet another difference between the symbolic evaluator module 48 and an actual machine is that the symbolic evaluator module 48 understands special instructions introduced by the parser module 46, such as the invariant instructions. As mentioned above, the symbolic evaluator module 48 can be implemented as a linear pass through the code because all loops are required to have an invariant.

The output of the symbolic evaluator module 48 is the safety predicate 34, which consists mainly of verification conditions. A verification condition is emitted, for example, whenever the symbolic evaluator module 48 encounters memory operations and emits verification conditions for their safety. Besides verification conditions, the symbolic evaluator module 48 also emits predicates corresponding to taken branches and invariants to reflect the control structure of the code in the safety predicate 34.

As mentioned above, each function, either exported by the code consumer or provided by the untrusted code 42, must have a precondition and a postcondition declared. The declarations for external functions are made by the code consumer as part of the safety policy. If the untrusted code 42 contains internal functions, their declarations must be part of the code annotations 44. The collection of these declarations is denoted by the signature Σ, which maps function labels to triplets containing a precondition, a post-condition and a set of modified global variables. $\Sigma_f$ is written as $\Sigma_f$=(Pre, Post, s) when function f is declared with the precondition Pre, postcondition Post and the set of modified global variables s.

The state of the symbolic evaluator module 48 consists of the current index i in the IL instruction stream and a partial mapping from variables to symbolic expressions $\rho \in$ VarState=Vars→Expr. $\rho[x \leftarrow e]$ is written to denote the state obtained from $\rho$ by setting the variable x to e and $\rho(e)$ is written to denote the expression resulting from the textual substitution of variables in e with their values in $\rho$. This substitution notation is extended to predicates.

To evaluate correctly the invariant instructions, the symbolic evaluator module 48 keeps track of the invariants seen on the path from the start to the current instruction. For each such invariant, the symbolic evaluator module 48 also retains the execution state at the time the invariant was encountered. This is accomplished by the mapping of $\mathcal{L}$ from instruction indices to states $\mathcal{L} \in$ Loops=Label→VarState, such that at any moment during symbolic execution Dom$\mathcal{L}$ is the set of invariants on the path from the start. The symbolic evaluator module 48 is also parameterized by the current function being evaluated and the current signature:

$$SE_{f,\Sigma} \in (\text{Label} \times \text{VarState} \times \text{Loops}) \rightarrow \text{Pred} \quad (1)$$

Because the current function f and signature $\Sigma$ can always be understood from the context, the subscripts of the SE function are often omitted.

To simplify the presentation of the evaluator it is assumed that prior to the evaluation the instruction INV Pre,s is prepended to the IL representation of each function f, where Pre and s are the precondition and the set of modified registers of f. This instruction is assumed to occur at the index f within the IL program.

Table 5 presents the definition of the symbolic evaluator function $SE_{f,\Sigma}(i,\rho,\mathcal{L})$ by cases depending on the instruction being evaluated ($IL_i$). For each kind of instruction there is one case, except for the invariant instructions, which are treated differently the first time when they are encountered.

Table 5 describes the symbolic evaluator using standard notations and programming constructs. The operator "$\forall$" is used to quantify over a set of variables (e.g. $\forall y_1 \ldots y_n$) instead of being limited to single variables (e.g. $\forall y_1 \ldots \forall y_n$). The symbol "$\supset$" is used to denote logical implication.

The simplest case is that of a SET instruction, when the state is updated and the symbolic evaluator module 48 is called recursively on the following instruction. In the case of an assertion the symbolic evaluator emits (as a conjunct of the resulting safety predicate) the asserted predicate with variables substituted according to the current state. In the case of a conditional branch the symbolic evaluator module 48 considers both branches recursively and then builds the safety predicate 34 as a conjunction of implications. The left side of each implication is the guard predicate of the branch. In this way control flow information is made available for the purpose of proving the verification conditions arising from the evaluation of the branches.

For MEMRD and MEMWR instructions the symbolic evaluator module 48 emits appropriate verification conditions for the safety of the memory access.

The processing of an invariant instruction depends on whether it has been evaluated before. If the current index is not in the domain of the association $\mathcal{L}$, an invariant is being evaluated for the first time. In this case the invariant is first asserted and then the remaining instructions are processed in a state obtained from the initial state by altering the variables that might be changed by the loop, and by associating the new state with the current index in $\mathcal{L}$. The invariant predicate is also assumed to hold before considering the remaining instructions. The next time the evaluator module 48 encounters this invariant instruction it finds an association for it in $\mathcal{L}$. In this case it asserts that the predicate holds and also checks that variables not declared as modified have not been changed. The reference state for this equality check is recovered from the association $\mathcal{L}$.

The verification conditions corresponding to the equality checks are generated by the auxiliary function checkEq, which is defined as follows:

$$\text{checkEq}(\rho, \rho', s) = \bigwedge_{x \in (Dom(\rho) \cap Dom(\rho'))-s} \rho(x) = \rho'(x) \quad (2)$$

The function call and return instructions are processed in a manner similar to the loop invariants, with just a few minor

TABLE 5

| | |
|---|---|
| $SE(i + 1, \rho[x \leftarrow \rho(e)], \mathcal{L})$ | if $IL_i$ = SET x,e |
| $\rho(P) \wedge SE(i + 1, \rho, \mathcal{L})$ | if $IL_i$ = ASSERT P |
| $(\rho(P_1) \supset SE(i_1, \rho, \mathcal{L})) \wedge (\rho(P_2) \supset SE(i_2, \rho, \mathcal{L}))$ | if $IL_i$ = BRANCH $P_1 \rightarrow i_1 \square P_2 \rightarrow i_2$ |
| | $i_1 < i \supset IL_{i_1}$ = INV |
| | $i_2 < i \supset IL_{i_2}$ = INV |
| saferd $(\rho(m), \rho(e)) \wedge SE(i + 1, \rho, \mathcal{L})$ | if $IL_i$ = MEMRD e |
| safewr $(\rho(m), \rho(e_1), \rho(e_2)) \wedge SE(i + 1, \rho, \mathcal{L})$ | if $IL_i$ = MEMWR $e_1, e_2$ |
| $\rho(P) \wedge \forall y_1 \ldots y_k . \rho'(P) \supset SE(i + 1, \rho', \mathcal{L}[i \leftarrow \rho'])$ | if $IL_i$ = INV P, $\{x_1, \ldots, x_k\}$ |
| | $i \notin Dom(\mathcal{L})$ |
| | $\{y_1, \ldots, y_k\}$ are new variables |
| | $\rho' = \rho[x_1 \leftarrow y_1, \ldots, x_k \leftarrow y_k]$ |
| $\rho(P) \wedge \text{checkEq}(\rho, \mathcal{L}_i, s)$ | if $IL_i$ = INV P,s and $i \in$ Dom(L) |
| $\rho(\text{Pre}) \wedge \forall y_1 \ldots y_k . \rho'(\text{Post}) \supset SE(i + 1, \rho', \mathcal{L})$ | if $IL_i$ = CALL l |
| | $II_i = (Pre, Post, \{x_1, \ldots, x_k\})$ |
| | $\{y_1, \ldots, y_k\}$ are new variables |
| | $\rho' = \rho[x_1 \leftarrow y_1, \ldots, x_k \leftarrow y_k]$ |
| $\rho(\text{Post}) \wedge \text{checkEq}(\rho, \mathcal{L}_f, s)$ | if $IL_i$ = RET and $II_f$ = (Pre, Post, s) | differences. In processing the RET instruction the reference state for the equality check is recovered from £. This is possible because the first instruction in each function (at index f) is the invariant instruction INV Pre,s.

In a preferred embodiment, the evaluator module 48 verifies some of the simple verification conditions. This has the effect of reducing the size of the safety predicate 34 and implicitly the size of the proof 38. The cost of this optimization is increased code complexity in the symbolic evaluator module 48, and so it must be employed only when the verification conditions are trivial to check. For example, most of the variable-equality checks emitted by checkEq are syntactic identities. Such checks are easy to verify; all others are emitted. Other equality verification conditions that can be verified by syntactic identity are those arising from the stack pointer assertions introduced by the parser module 46.

The safety predicate 34 for a function is obtained by evaluating it symbolically starting in a state that maps the global variables (the special memory variable mem is also a global variable) and function formal parameters to new variables $y_1, \ldots, y_k$. For convenience in the proving phase the safety predicate 34 is closed by quantifying over $y_1, \ldots, y_k$:

$$SP_f = \forall y_1 \ldots y_k . SE_{f,\Sigma}(f, [g_1 \leftarrow y_1, \ldots, g_k \leftarrow y_k], \{\}) \quad (3)$$

Figure 5:
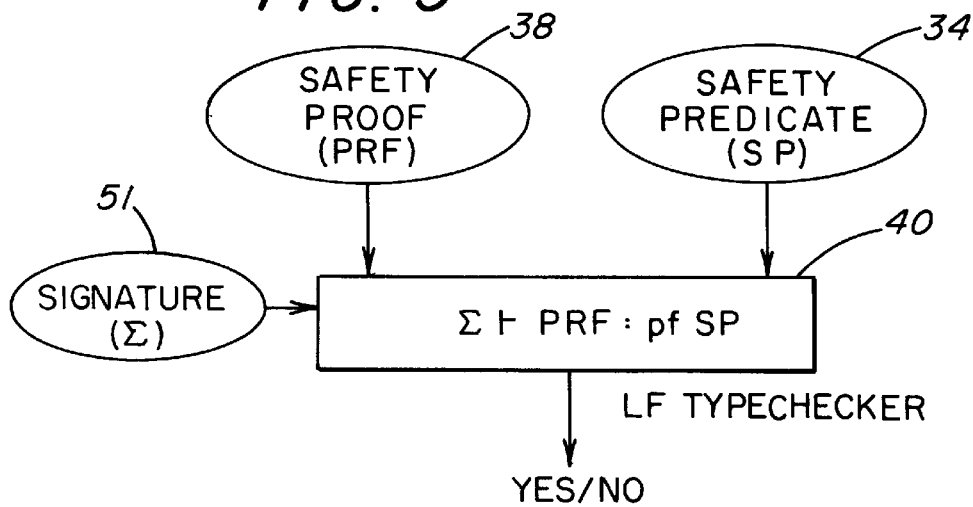
FIG. 5 is a diagram illustrating an implementation of the proof checker module of FIG. 3.

FIG. 5 is a diagram illustrating an implementation of the proof checker module 40 of FIG. 3. The function of the proof checker module 40 is to verify that the proof 38 supplied by the untrusted proof producer uses only allowed axioms and inference rules and that it is a proof of the required safety predicate 34. To isolate the dependencies on the safety policy the proof checker module 40 is parameterized by a configuration file. The proof checker module 40 itself does not contain any details of the safety policy, not even of the logic being used. All such details are segregated to an LF signature ($\Sigma$) 51.

To achieve the independence on the safety policy and logic, both the safety predicates and their proofs can be encoded in, for example, the Edinburgh Logical Framework (LF), as described in Harper, R. et al., "A Framework for Defining Logics", Journal of the Association for Computing Machinery 40, 1 (January 1993), pp. 143–84, which is incorporated herein by reference, and which was specifically designed as a metalanguage for high-level specification of logics. An explanation of LF as it relates to logical proofs can be found in Necula, G. et al., "Efficient Representation of and Validation of Logical Proofs", Technical Report CMU-CS-97-172, Computer Science Department, Carnegie Mellon University, October 1997, which is incorporated herein by reference.

The Logical Framework is a typed language (dependent-typed λ-calculus) with 4 expression constructors (variables, constants, functions and function application), and a similar set of type constructors:

Types $A ::= \alpha \mid AM \mid \Pi x : A_1 . A_2$

Objects $M ::= c \mid x \mid M_1 M_2 \mid \lambda x : A . M$ \quad (4)

To encode the syntax of a particular logic (the predicates) and its semantics (the axioms and inference rules) a set of LF expression constants and their types is declared. This set of constant declarations is shown as the LF signature ($\Sigma$) 51 that defines the logic. Table 6 shows a small fragment of the signature 51 that defines first-order logic with integers. The first two lines declare the constant 0 to be an expression (the representation of the numeral 0), and plus to be a binary constructor. The LF objects $M_1$ and $M_2$ are the representations of respectively $e_1$ and $e_2$, and the LF object "plus $M_1$ $M_2$" is the LF representation of $e_1 + e_2$. Similarly, the predicate constructors shown in the middle section of Table 6 are provided. In the bottom third of Table 6 the declaration of two proof constructors is shown. true_i is a nullary proof constructor (a proof constant) that represents the axiom that the predicate "true" is always valid. The proof constructor and_i is used to represent the proof of a conjunction by conjunction introduction. For example, if $M_1$ and $M_2$ are the LF representations of the proofs for the predicates $P_1$ and $P_2$, then the LF object "and_i $P_1$ $P_2$ $M_1$ $M_2$" is the LF representation of the proof of the predicate $P_1 \wedge P_2$.

TABLE 6

| | | |
|---|---|---|
| 0 | : | exp |
| plus | : | exp → exp → exp |
| ... | | |
| true | : | pred |
| and | : | pred → pred → pred |
| impl | : | pred → pred → pred |
| = | : | exp → exp → pred |
| <> | : | exp → exp → pred |
| ... | | |
| true_i | : | pf true |
| and_i | : | Πp:pred.Πr:pred.pf p → pf r → pf (and p r) |

In a preferred embodiment of the present invention, the LF signatures 51 are contained in proof-checker configuration files using a format that is virtually identical to the one shown in Table 6. In such an embodiment the LF signature 51 must itself pass a type-checker before being accepted by the proof-checker module 40.

LF was chosen for proof checking because of the richness of the type system. In particular the safety predicate 34 can be encoded as an LF type pf SP. The proof 38 is also encoded as an LF expression PRF that can contain constants declared in the signature 51.

Both the validity of the proof 38 and the fact that it is a proof of the safety predicate 34 are verified by checking that the expression PRF has type pf SP when the constants occurring in PRF and SP are declared as in $\Sigma$. This type-checking operation is written as:

$$\bullet_\Sigma PRF : pf\, SP \quad (5)$$

The typing rules can be found in Harper et al. and Necula et al., referenced hereinabove.

The preferred embodiment of the present invention as described adheres to a minimalist design principle because LF type checking can be completely described by 15 inference rules and even an optimized implementation is less than about 5 pages of C code. Furthermore, because the proof checker module 40 is completely independent of the particular logic being used by the safety policy, the proof checker module 40 can be reused for checking proofs in other logics. In addition, because LF type-checking is simple and abstract, it is amenable to formal proofs of algorithm correctness.

Safety predicates are expressed using first-order logic, with all code or machine details either abstracted or modeled in the logic. Therefore, the main requirement on the proof generator module 36 is that it produces proofs of first-order logic predicates. The advantage of this approach is that the proof generator module 36 can be independent of any particular code or physical machine. The proof generator module 36 does not even have to ascertain whether the predicate to be proved originates from an implementation of the present invention or from some other use of first-order logic.

For first-order logic, many theorem-proving systems have been implemented. For example, Boyer, R. et al., "A Computational Logic", Academic Press, 1979; Constable, R. et al., "Implementing Mathematics with the Nuprl Proof Development System", Prentice Hall, 1986; Coquand, T. et al., "Constructions: A Higher Order Proof System for Mechanizing Mathematics", Proceedings of the European Conference on Computer Algebra (EU-ROCAL '85)", LNCS 203 (1985), Springer-Verlag, pp. 151–84; Detlefs, D., "An Overview of the Extended Static Checking System", Proceedings of the First Formal Methods in Software Practice Workshop 1996"; Gordon, M., "HOL: A Machine Oriented Formulation of Higher-Order Logic", Tech. Rep. 85, University of Cambridge, Computer Laboratory, July 1985; and Owre, S. et al., "A Prototype Verification System", $11^{th}$ International Conference on Automated Deduction (CADE), June 1992, vol. 67 of Lecture Notes in Artificial Intelligence, Springer-Verlag, pp. 748–52, which are incorporated herein by reference, provide theorem proving systems for first order logic. Each of the algorithms presented in these papers is capable of proving typical safety predicates, sometimes with the help of additional tactics that might be provided by the code consumer. However, for some safety properties, automatic decision procedures do not exist or are not effective. In such cases it is more practical to use a semi-interactive theorem prover guided by a person with a deep understanding of the reasons underlying the safety of the untrusted code.

To be usable as a proof generator in an implementation of the present invention, a theorem prover must not only be able to prove the safety predicate but must be capable of generating a detailed proof of a proved safety predicate. Furthermore, the detailed proof must be expressed in the particular logic (i.e., using the axioms and inference rules specified as part of the safety policy) used by the code consumer. In preferred embodiments of the present invention, two different theorem provers have been used. The first, and most primitive, theorem prover was developed using the Elf implementation of LF, as described in Pfenning, F., "Elf: A Language for Logic Definition and Verified Meta-Programming", Fourth Annual Symposium on Logic in Computer Science, June 1989, IEEE Computer Society Press, pp. 313–22, which is incorporated herein by reference. The E-f system is able to read an LF signature describing a logic and then answer queries of the form: Is there any LF object M having type pf P? If P is the representation of the predicate that is desired to be proven and the answer to the query is yes, then M is a representation of the proof, and by construction it is valid with respect to the LF signature used for search. Thus, the theorem prover is the Elf system together with the LF signature that is part of the safety policy.

Another preferred embodiment uses an implementation of a theorem prover based on the Nelson-Oppen architecture for cooperating decision procedures as cited in Nelson, G., et al., "Simplification by Cooperating Decision Procedures", ACM Transactions on Programming Languages and Systems 1, 2, October 1979, pp. 245–57, which is incorporated herein by reference. The theorem prover uses several decision procedures, the most notable ones being Simplex for deciding linear inequalities and the congruence closure for deciding equalities. In addition it also incorporates a decision procedure for modular arithmetic and a simple matcher. The theorem prover is a complicated system implementing complex algorithms, but by making it output proofs its soundness does not have to be relied on.

It can be understood by those skilled in the art that other theorem provers, such as those shown in Luckham, D., et al., "Stanford Pascal Verifier User Manual", Tech. Rep. STAN-CS-79-731, Dept. of Computer Science, Stanford Univ., March 1979, and Detlefs, D., "An Overview of the Extended Static Checking System", Proceedings of the First Formal Methods in Software Practice Workshop, 1996 can be used.

Figure 6:
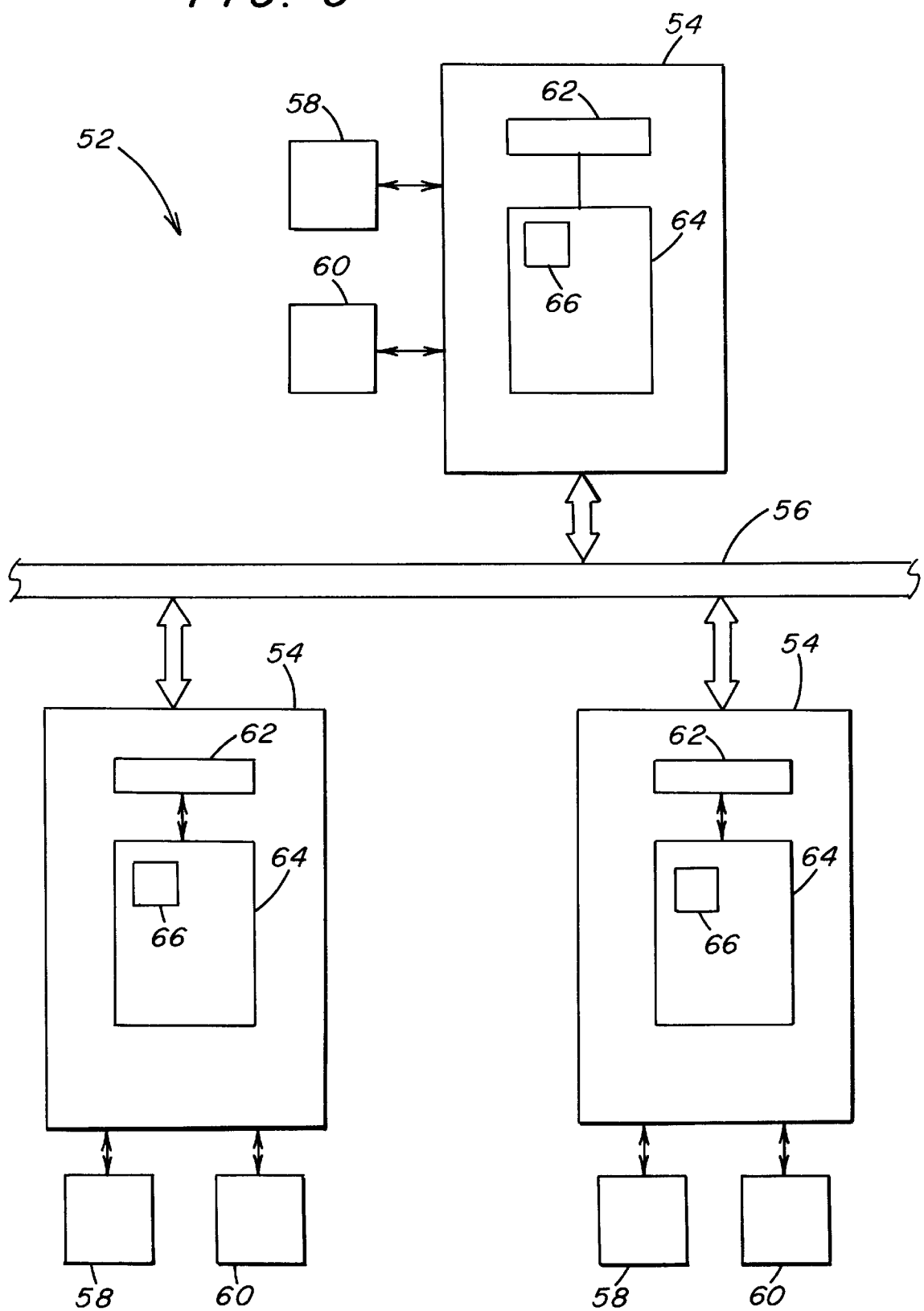
FIG. 6 is a diagram illustrating a distributed computing system in which the present invention may be used.

FIG. 6 is a diagram illustrating a distributed computing system 52 in which the present invention may be used. The system 52 includes workstations 54 that are connected to a communication channel 56. The workstations 54 may be any type of workstation computer such as, for example, a Sun Sparcstation or an IBM RISC 6000, or may be any type of personal computer such as, for example, an Apple Macintosh or an IBM compatible PC. The communication channel 56 may be of any type of communication media such as, for example, a system bus, a token ring, an Ethernet, or the Internet. The workstations 54 include input devices 58 and output devices 60. The workstations also include processors 62 which may be, for example, a microprocessor such as an Intel Pentium microprocessor, or may be an application specific integrated circuit (ASIC).

The workstations 54 include memory storage devices 64. The memory storage devices 64 can be any type of computer storage device such as, for example, an array of DASD, a floppy disk drive, a computer memory (such as, for example, a random access memory (RAM) or a read only memory (ROM)), a compact disk drive, or a magnetic hard drive. Software verification modules 66, of the type disclosed herein in conjunction with the present invention, are stored in the computer storage devices 64. The modules 66 may include any or all of the modules discussed in conjunction with FIG. 3 (i.e. the VCGen module 32, the proof generator module 36, and the proof checker module 40).

It can be understood by those skilled in the art that any of the workstations 54 can function as a code producer, a code consumer, or a proof producer depending on which workstation desires another workstation to execute software that is untrusted as to the code consumer workstation. Also, any of the workstations 54 may individually act as a code consumer, code producer, and proof producer when an application having application software that is resident on the workstation desires to have another application that is on the same workstation execute the software, which is untrusted as to the second application.

It can be understood by those skilled in the art that the present invention may be incorporated into a number of hardware applications such as, for example, the system 52 described in conjunction with FIG. 6, a system utilizing PCMCIA cards, a system utilizing "smart" cards, or a system utilizing credit cards.

While the present invention has been described in conjunction with preferred embodiments thereof, many modifications and variations will be apparent to those of ordinary skill in the art. The foregoing description and the following claims are intended to cover all such modifications and variations.

What is claimed is:

1. A computer-implemented method of verifying that untrusted software supplied by a code producer is safe to execute by a code consumer, comprising the steps of:

defining a safety policy that specifies safe operating conditions of the untrusted software on the code consumer;

generating a safety predicate for the untrusted software that determines if execution by the code consumer of the untrusted software will violate said safety policy;

generating a safety proof that proves that said safety predicate is valid; and validating the untrusted software for execution based on said safety proof and said safety predicate prior to execution of the untrusted software.

2. The computer-implemented method of claim 1 further comprising the steps of:
   installing the untrusted software on the code consumer if the untrusted software was successfully validated by said validating step; and
   discarding the untrusted software if the untrusted software was unsuccessfully validated by said validating step.

3. The computer-implemented method of claim 1 wherein said step of generating a safety predicate includes the step of adding said safety predicate to the untrusted software.

4. The computer-implemented method of claim 3 further comprising the step of extracting said safety predicate from the untrusted software.

5. The computer-implemented method of claim 1 further comprising the step of adding annotations to the untrusted software.

6. The computer-implemented method of claim 1 wherein said step of generating a safety predicate includes the steps of:
   checking a plurality of safety properties of the untrusted software; and
   checking the untrusted software for instructions that may violate said safety policy.

7. The computer-implemented method of claim 1 wherein said step of validating the untrusted software includes the steps of:
   verifying that each inference step in said proof is a valid instance of axioms and rules in said safety policy; and
   verifying that said proof proves said safety predicate.

8. The computer-implemented method of claim 1 wherein said step of generating a safety predicate includes the steps of:
   translating the untrusted software to a stream of instructions in a generic intermediate language; and
   producing said safety predicate by executing said intermediate language instruction stream.

9. An apparatus for verifying that software supplied by a code producer is safe to execute by a code consumer, comprising:
   a predicate generator module responsive to annotated untrusted software, said generator module for generating a safety predicate;
   a proof generator module responsive to said safety predicate, said proof generator module for generating a safety proof; and
   a proof checker module responsive to said safety predicate and said safety proof, said proof checker module for verifying that said safety predicate complies with a safety policy defined by the code consumer prior to execution of the software.

10. The apparatus of claim 9 wherein said predicate generator module includes:
    a language dependent parser module having as an input said annotated untrusted software, said parser module for translating said untrusted software to a stream of instructions in a generic intermediate language; and
    a symbolic evaluator module responsive to said parser module and a configuration file, said symbolic evaluator module for generating said safety predicate.

11. An apparatus for verifying that software supplied by a code producer is safe to execute by a code consumer, comprising:
    means for generating a safety predicate for untrusted software;
    means for generating a safety proof from said safety predicate; and
    means for verifying that said safety predicate complies with a safety policy defined by the code consumer based on said safety predicate and said safety proof prior to execution of the untrusted software.

12. A computer system, comprising:
    a processor;
    at least one input device for receiving untrusted software;
    a communication link enabling communications between said processor and said input device; and
    a memory coupled to said processor and storing a set of ordered data and a set of instructions which, when executed by said processor, cause said processor to perform the steps of:
       generating a safety predicate for said untrusted software for determining if execution by a code consumer of said untrusted software will violate a safety policy defined by said code consumer;
       generating a safety proof that proves that said safety predicate is valid; and
       validating said untrusted software for execution based on said safety proof and said safety predicate prior to execution of the untrusted software.

13. The system of claim 12 wherein said memory stores an additional set of ordered data and instructions which, when executed by said processor, cause said processor to perform the additional steps of:
    installing said untrusted software on said code consumer if said untrusted software was successfully validated by said validating step; and
    discarding said untrusted software if said untrusted software was unsuccessfully validated by said validating step.

14. The system of claim 12 wherein said memory stores an additional set of ordered data and instructions which, when executed by said processor, cause said processor to perform the step of adding said safety predicate to said untrusted software.

15. The system of claim 14 wherein said memory stores an additional set of ordered data and instructions which, when executed by said processor, cause said processor to perform the additional step of extracting said safety predicate from said untrusted software.

16. The system of claim 12 wherein said memory stores an additional set of ordered data and instructions which, when executed by said processor, cause said processor to perform the additional step of adding annotations to said untrusted software.

17. The system of claim 12 wherein said memory stores an additional set of ordered data and instructions which, when executed by said processor, cause said processor to perform the step of generating a safety predicate by performing the steps of:
    checking a plurality of safety properties of said untrusted software; and
    checking said untrusted software for instructions that may violate said safety policy.

18. The system of claim 12 wherein said memory stores an additional set of ordered data and instructions which, when executed by said processor, cause said processor to perform said step of validating said untrusted software by performing the steps of:
    verifying that each inference step in said proof is a valid instance of axioms and rules in said safety policy; and
    verifying that said proof proves said safety predicate.

19. The system of claim 12 wherein said memory stores an additional set of ordered data and instructions which, when executed by said processor, cause said processor to perform said step of generating a safety predicate by performing the steps of:

translating said untrusted software to a stream of instructions in a generic intermediate language; and producing said safety predicate by executing said intermediate language instruction stream.

20. A computer-readable medium having stored thereon instructions which, when executed by a processor, cause said processor to perform the steps of:

generating a safety predicate for determining if execution by a code consumer of untrusted software will violate a safety policy defined by said code consumer;

generating a safety proof that proves that said safety predicate is valid; and validating said untrusted software for execution based on said safety proof and said safety predicate prior to execution of the untrusted software.

21. The computer-readable medium of claim 20 having stored thereon instructions which, when executed by said processor, cause said processor to perform the additional steps of:

installing said untrusted software on said code consumer if said untrusted software was successfully validated by said validating step; and discarding said untrusted software if said untrusted software was unsuccessfully validated by said validating step.

22. The computer-readable medium of claim 20 having stored thereon additional instructions which, when executed by said processor, cause said processor to perform the step of adding said safety predicate to said untrusted software.

23. The computer-readable medium of claim 22 having stored thereon additional instructions which, when executed by said processor, cause said processor to perform the additional step of extracting said safety predicate from said untrusted software.

24. The computer-readable medium of claim 20 having stored thereon additional instructions which, when executed by said processor, cause said processor to perform the additional step of adding annotations to said untrusted software.

25. The computer-readable medium of claim 20 having stored thereon additional instructions which, when executed by said processor, cause said processor to perform the step of generating a safety predicate by performing the steps of:

checking a plurality of safety properties of said untrusted software; and checking said untrusted software for instructions that may violate said safety policy.

26. The computer-readable medium of claim 20 having stored thereon additional instructions which, when executed by said processor, cause said processor to perform said step of validating said untrusted software by performing the steps of:

verifying that each inference step in said proof is a valid instance of axioms and rules of said safety policy; and verifying that said proof proves said safety predicate.

27. The computer-readable medium of claim 20 having stored thereon additional instructions which, when executed by said processor, cause said processor to perform said step of generating a safety predicate by performing the steps of:

translating said untrusted software to a stream of instructions in a generic intermediate language; and producing said safety predicate by executing said intermediate language instruction stream.

28. A computer-readable medium having stored thereon instructions which, when executed by a code consumer, cause said code consumer to perform the steps of:

defining a safety policy that specifies safe operating conditions of untrusted software on the code consumer;

generating a safety predicate that determines if execution by the code consumer of said untrusted software will violate said safety policy; and validating said untrusted software for execution based on a safety proof and said safety predicate prior to execution of untrusted software.

29. A computer-readable medium having stored thereon instructions which, when executed by a proof producer, cause said proof producer to perform the step of explicitly generating a safety proof that proves that a safety predicate is valid prior to execution of untrusted software.

* * * * *

UNITED STATES PATENT AND TRADEMARK OFFICE
CERTIFICATE OF CORRECTION

PATENT NO. : 6,128,774
DATED : October 3, 2000
INVENTOR(S) : Necula et al.

It is certified that error appears in the above-identified patent and that said Letters Patent is hereby corrected as shown below:

Column 15,
Line 42, delete "E-f" and substitute therefor -- Elf --.

Signed and Sealed this

Thirtieth Day of April, 2002

Attest:

JAMES E. ROGAN
Attesting Officer
Director of the United States Patent and Trademark Office